(12) United States Patent
Tsirkin et al.

(10) Patent No.: US 12,393,439 B2
(45) Date of Patent: Aug. 19, 2025

(54) COPYLESS NUMA BALANCING HYPERVISOR MEMORY MIGRATION

(71) Applicant: Red Hat, Inc., Raleigh, NC (US)

(72) Inventors: Michael Tsirkin, Raanana (IL); Andrea Arcangeli, New York, NY (US)

(73) Assignee: Red Hat, Inc., Raleigh, NC (US)

(*) Notice: Subject to any disclaimer, the term of this patent is extended or adjusted under 35 U.S.C. 154(b) by 564 days.

(21) Appl. No.: 17/852,258

(22) Filed: Jun. 28, 2022

(65) Prior Publication Data
US 2023/0418649 A1     Dec. 28, 2023

(51) Int. Cl.
G06F 9/455     (2018.01)

(52) U.S. Cl.
CPC .......... *G06F 9/45558* (2013.01); *G06F 2009/45562* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 9,684,682 B2 | 6/2017 | Mukherjee et al. | |
| 9,977,738 B2 | 5/2018 | Venkatasubramanian et al. | |
| 10,613,990 B2 | 4/2020 | Arcangeli et al. | |
| 10,705,879 B2 | 7/2020 | Oshins | |
| 10,776,151 B2 | 9/2020 | Kim et al. | |
| 10,788,989 B2 | 9/2020 | Gray | |
| 10,810,037 B1* | 10/2020 | Liu | G06F 9/45558 |
| 2019/0391843 A1* | 12/2019 | Franciosi | G06F 12/1072 |
| 2022/0374269 A1* | 11/2022 | Ali | G06F 12/0882 |

OTHER PUBLICATIONS

Geunsik Lim, Sang-Bum Suh, "User-Level Memory Scheduler for Optimizing Application Performance in NUMA-Based Multicore Systems" Software Center, Samsung Electronics, Republic of Korea, Oct. 2014, 4 pages.
Song Wu, Huahua Sun, Like Zhou, Qingtian Gan, Hai Jin, "vProbe: Scheduling Virtual Machines on NUMA Systems" 2016 IEEE International Conference on Cluster Computing, 2016, pp. 70-79.

* cited by examiner

*Primary Examiner* — Bradley A Teets
*Assistant Examiner* — Melissa A Headly
(74) *Attorney, Agent, or Firm* — Kilpatrick Townsend & Stockton LLP

(57) ABSTRACT

Systems and method for automated efficient memory migration in Non-uniform Memory Access (NUMA) based virtual machines are introduced, comprising exporting one or more informative data objects, from a host machine to at least one virtual machine, wherein the informative data objects include references to pages that have been migrated from a physical source memory node (source node) on the host machine to a new source location on the host machine; inspecting, the informative data objects, by the at least one virtual machine; detecting, by the at least one virtual machine, the pages that have been migrated to the new source location; sending a request, by the at least one virtual machine, to the host machine via the hypervisor, to map the pages to a physical destination memory node (destination node) corresponding to a desired virtual destination memory node (destination vNode); and undertaking at least one efficient data migration operation.

20 Claims, 5 Drawing Sheets

COPYLESS NUMA BALANCING HYPERVISOR MEMORY MIGRATION

FIELD OF INVENTION

The present technology pertains to systems and methods for efficient memory and data transfers in NUMA balancing architectures as deployed by virtual machines. In particular, but not by way of limitation, the present technology provides a Copyless NUMA Balancing Hypervisor Memory Migration.

SUMMARY

In some embodiments the present technology is directed to a method for automated efficient memory migration in Non-uniform Memory Access (NUMA) based virtual machines, the method comprising exporting one or more informative data objects, from a host machine to at least one virtual machine, via a hypervisor, wherein the informative data objects include references to pages that have been migrated from a physical source memory node (source node) on the host machine to a new source location on the host machine; inspecting, the informative data objects, by the at least one virtual machine; detecting, by the at least one virtual machine, the pages that have been migrated to the new source location; sending a request, by the at least one virtual machine, to the host machine via the hypervisor, to map the pages to a physical destination memory node (destination node) corresponding to a desired virtual destination memory node (destination vNode); and undertaking at least one efficient data migration operation.

In various embodiments, the method comprises the at least one efficient data migration operation removing mapping of the pages from the source node to the destination node; and mapping, via the hypervisor, the new source location to the destination node, wherein the mapping allows data to be migrated from the new source location instead of from the source node. In some embodiments, the method further comprises migrating the data from the new source location to the destination node. In other embodiments, the method includes reading the data from the new source location; and writing the data into the destination node. The method may also comprise mapping the destination node to the destination vNode, wherein the destination node contains the pages.

In several aspects, the sending of the request in the method further comprises a request to migrate data directly from the new source location to the destination node corresponding to the destination vNode prior to mapping operations between the new source location and the destination node. Furthermore, the method may also in some aspects include migrating data from the new source location to the destination node prior to any implementation of mapping operations between the new source location and the destination node.

BRIEF DESCRIPTION OF THE DRAWINGS

In the description, for purposes of explanation and not limitation, specific details are set forth, such as particular embodiments, procedures, techniques, etc. to provide a thorough understanding of the present technology. However, it will be apparent to one skilled in the art that the present technology may be practiced in other embodiments that depart from these specific details.

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

Figure 1:
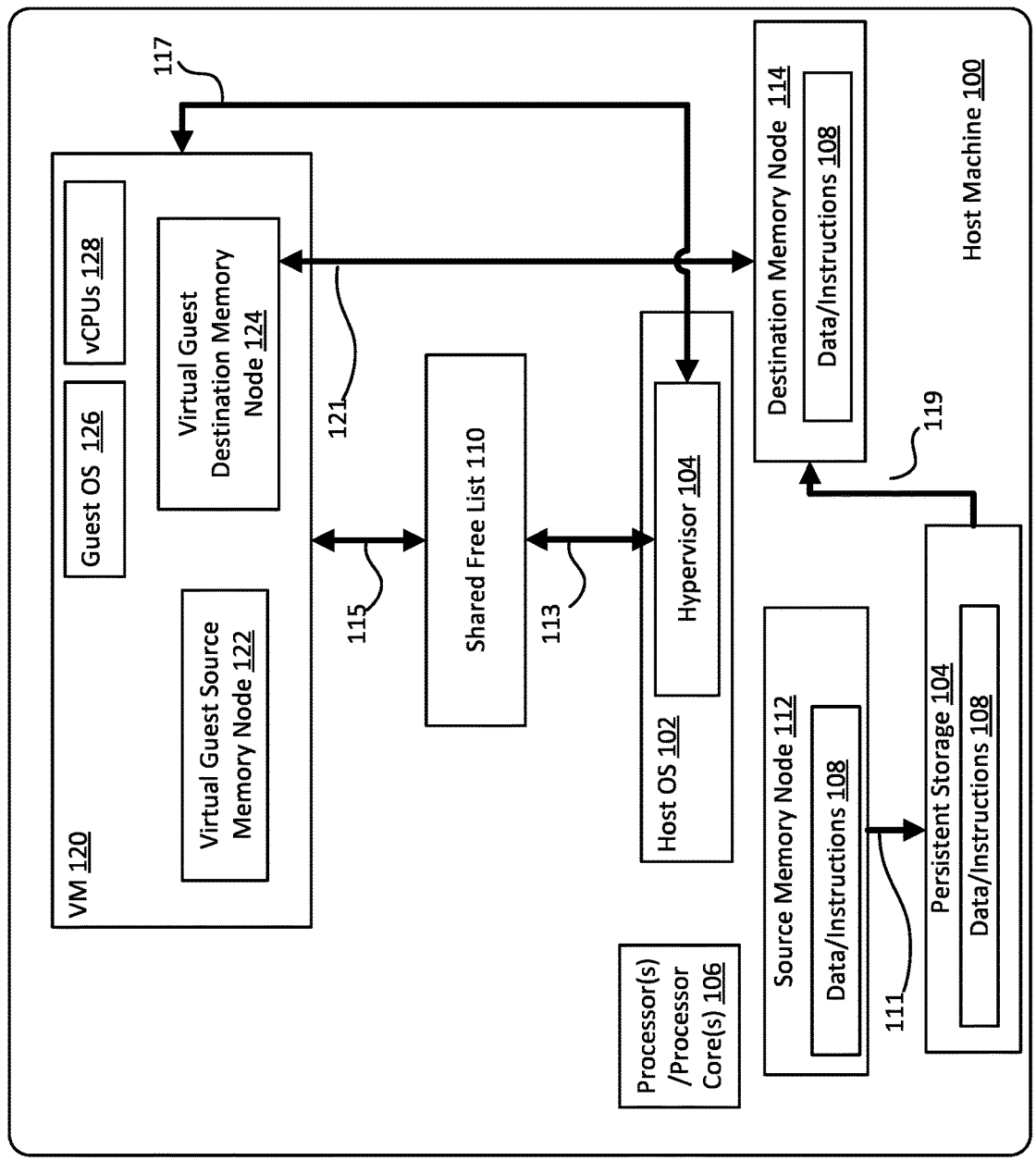

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1 presents one embodiment of the systems and methods including computing architecture for undertaking efficient copyless NUMA memory migrations.

Figure 2:
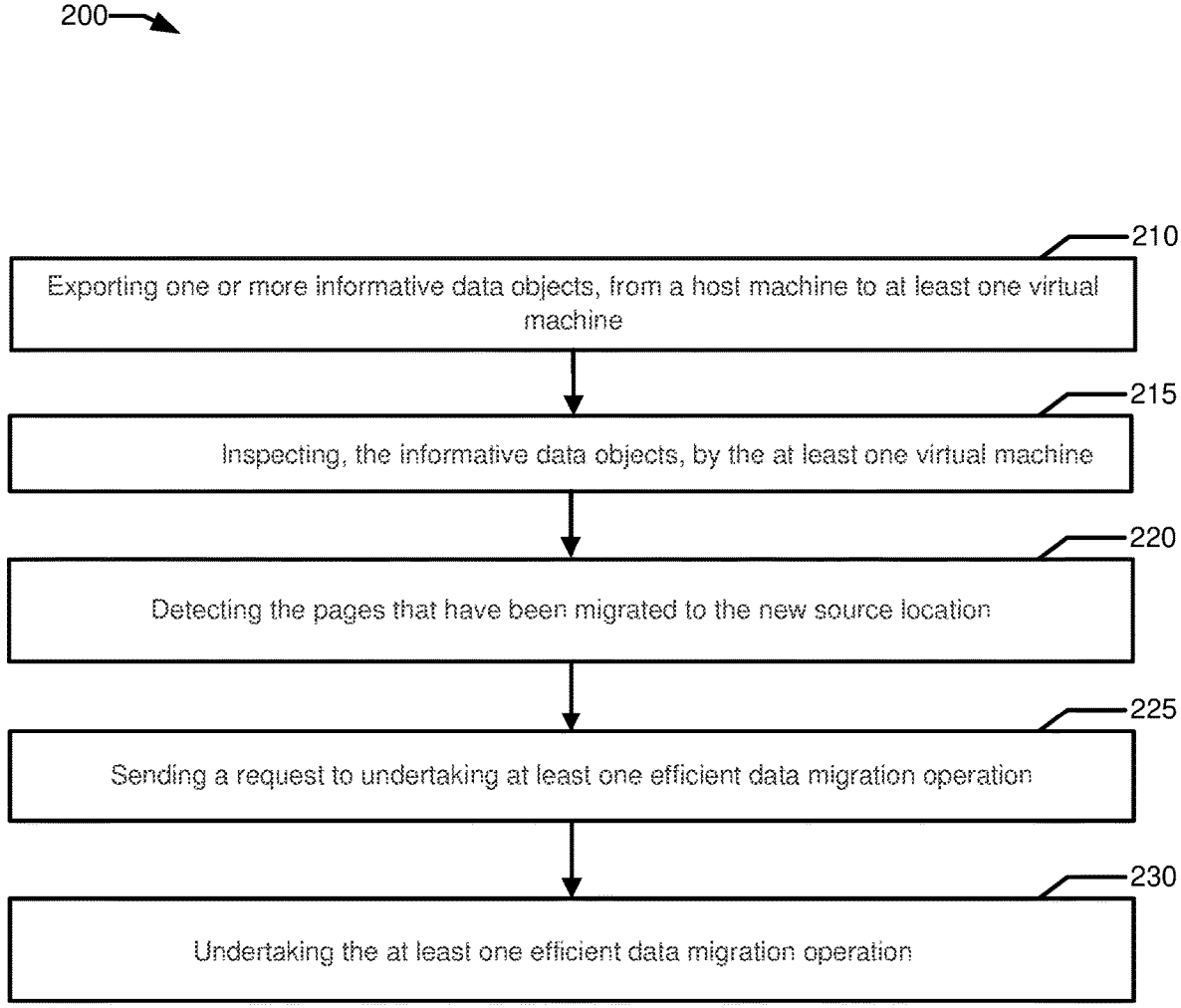

FIG. 2 presents one embodiment of a method for copyless NUMA memory migrations.

Figure 3:
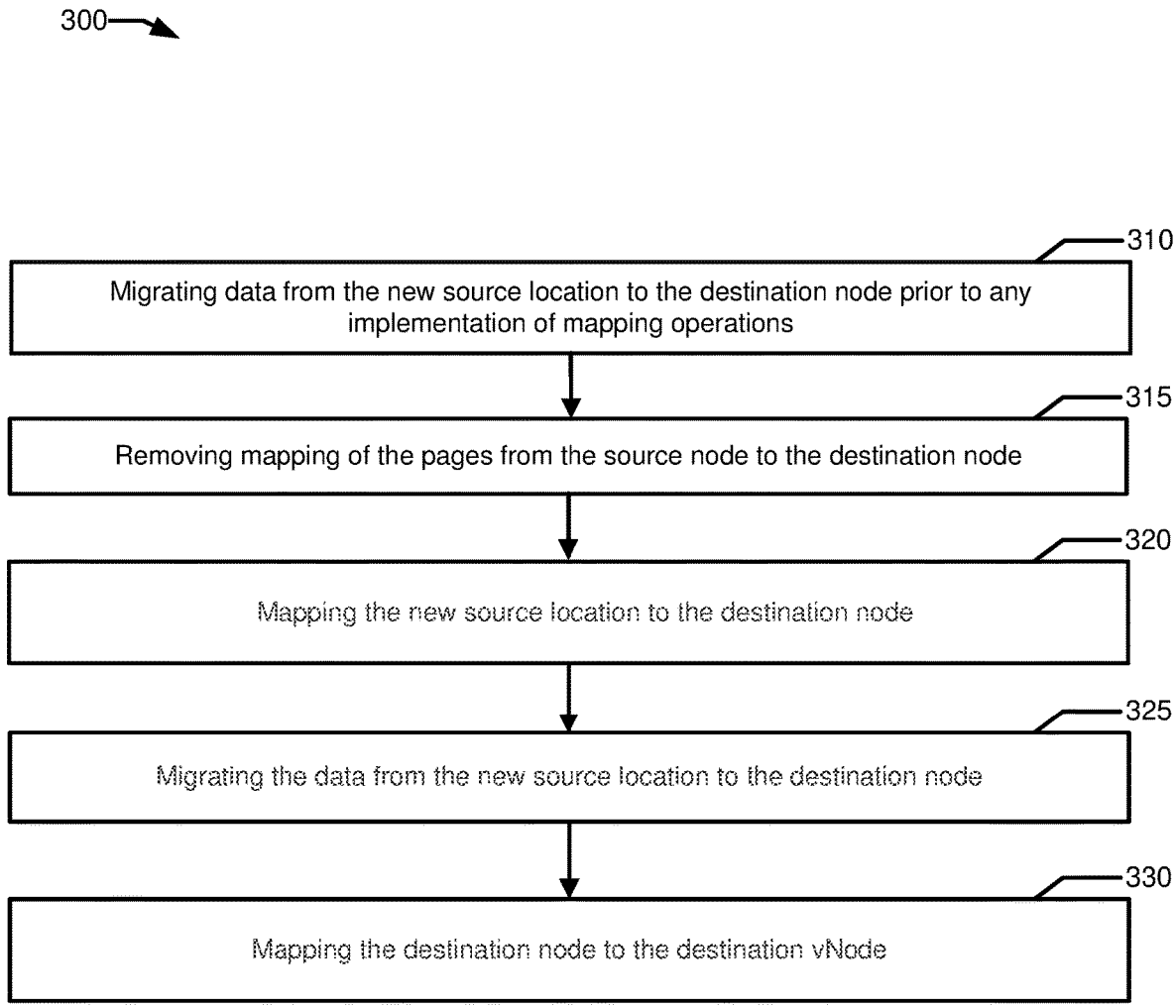

FIG. 3 presents one embodiment of a method for undertaking an efficient data migration operation.

Figure 4:
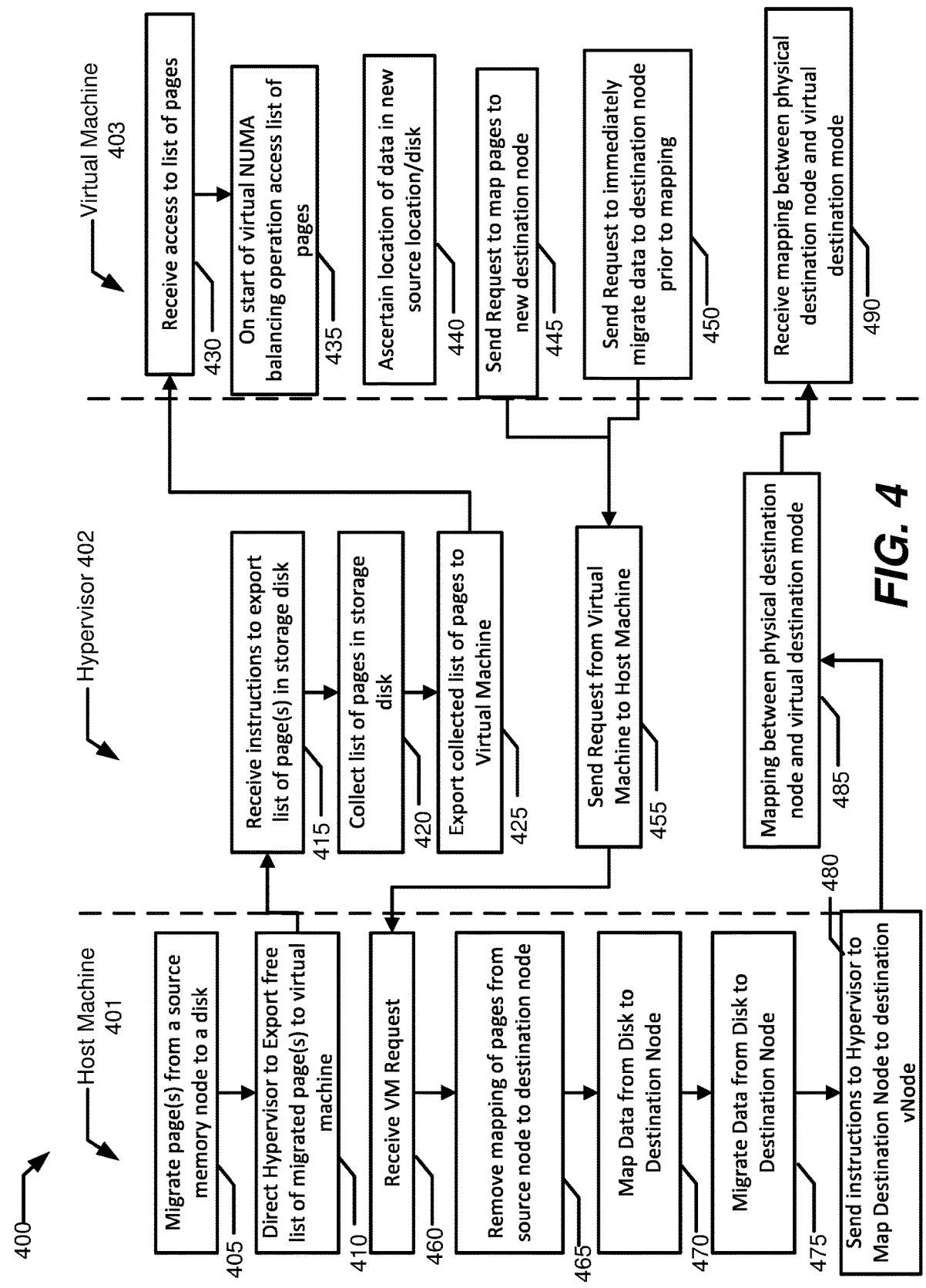

FIG. 4 presents an embodiments of the methods described herein executed on various parts of the system(s) discussed.

Figure 5:
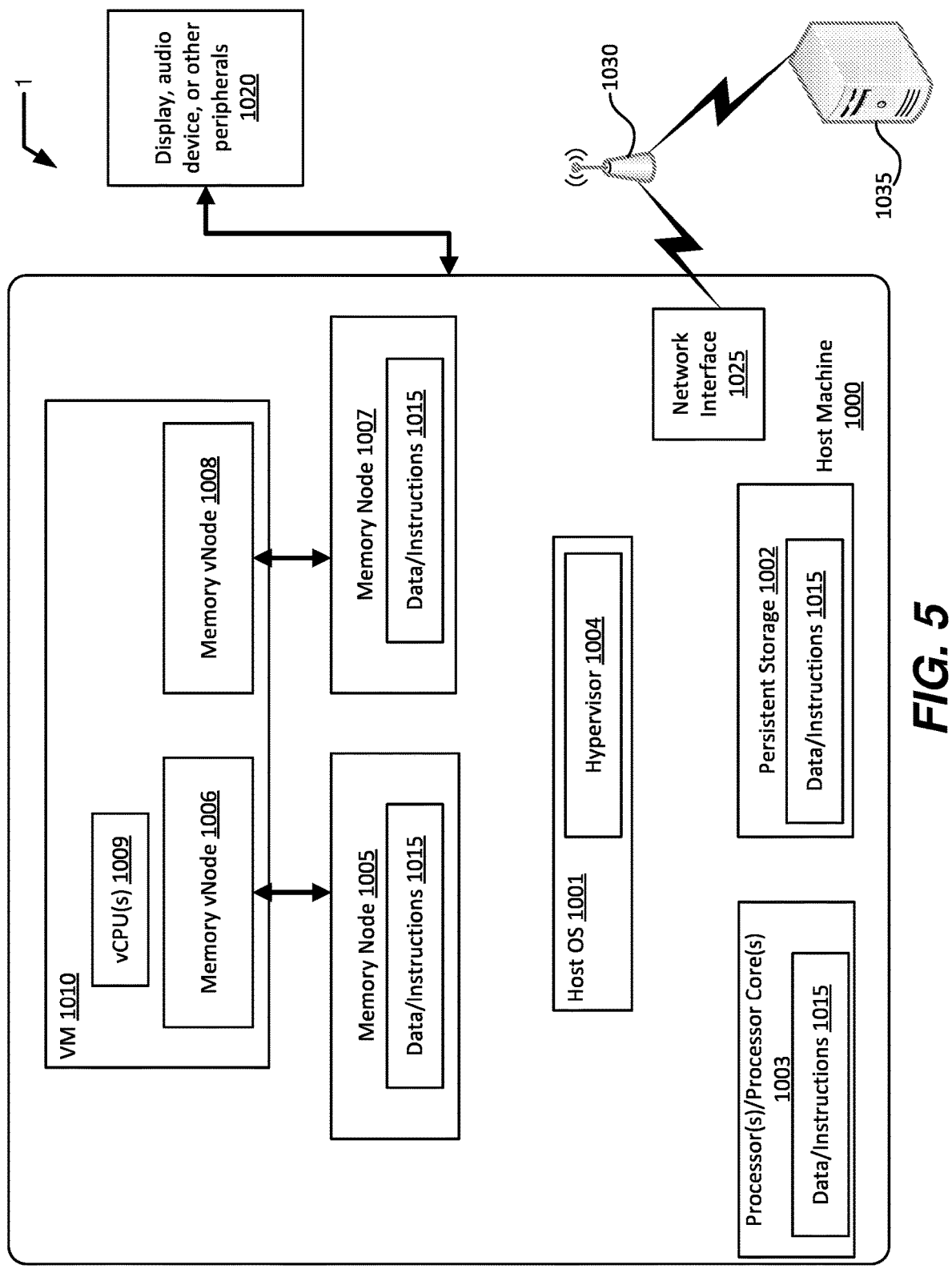

FIG. 5 illustrates one embodiment of an example machine 1000 as part of system 1 within which a set of instructions for causing the machine to perform the methods discussed herein.

DETAILED DESCRIPTION

The approaches described in this section could be pursued but are not necessarily approaches that have previously been conceived or pursued. Therefore, unless otherwise indicated, it should not be assumed that any of the approaches described in this section qualify as prior art merely by virtue of their inclusion.

Non-Uniform Memory Access (NUMA) architectures employ automatic NUMA balancing techniques to improve the performance of applications running on NUMA-hardware systems. NUMA balancing techniques ensure that processes are accessing memory on the same NUMA node where the processing threads are scheduled in order to minimize distance between thread processing and data by moving data accessed by processes closer to the processes and threads. NUMA balancing occurs because when processes are running, the processes may be moved to different processors or processor cores to be executed, however when processes are moved, data relating to the processes that will have to be accessed when the processes are executed remain in the memory nodes they reside in, meaning that the distance will increase between the processor and the data it must access, leading to longer retrieval distances and longer retrieval times. This is when NUMA balancing techniques are used to migrate data and instructions from one or more source memory nodes to one or more destination memory nodes that are closer to the processes in the respective processor cores. NUMA balancing occurs automatically and continuously in NUMA-based architectures.

However, NUMA balancing can also occur in virtual machines running on host physical machines, which also attempt to improve and reduce distances between processing and memory retrieval locations. However, because virtual machines are guest processes run on a hardware environment, they do not have access to, or control of the movement of data and pages from different memory nodes to others on the physical memory nodes. Data migration occurs via the physical machine (host) operating system (OS) which controls movement of pages of data between different node components. Therefore when a virtual machine is running on a host machine, there is a hypervisor that interfaces between the two and controls the functions of the guest or virtual machine, and allows communication between the host and guest and to send and receive instructions between the two.

In situations where a virtual machine or guest is running on a physical machine or host, and the guest is running a NUMA-based architecture, the guest includes virtual memory nodes (vNodes), the virtual memory nodes generally correspond to their physical counterparts on the host machine. These vNodes may be pinned or linked to the physical nodes. The architecture of pinning virtual nodes to physical corresponding ones is an efficient method to run large guests on a physical host. For example a virtual node 0 will be pinned to memory node 0 on the host machine, and virtual node 1 will be pinned to a memory node 1 on the host machine. This means that when the guest machines wishes to undertake NUMA balancing, since the guest is running a NUMA based architecture, when it is migrating data from vNode 0 to vNode 1 the actual operation that is being undertaken is migrating the data from a physical memory node 0 to a memory node 1. This means that any memory migrations or attempts to move memory on the virtual machine or guest must occur on the underlying hardware on the host, and instructions must be relayed between host and guest to allow this to happen, generally via a hypervisor.

The host machine undertakes its own memory swaps and migrations independently from the guest and without the guest virtual machine being updated, this occurs continuously, for example when a host has data or instructions for idle processes taking up memory space in a memory node, this data is swapped out into a disk, especially into an SSD or other type of persistent storage (may also be referred to herein as "new source location") to free up the space in the memory node to allow other processes to store their memory and data in the memory node. Currently a virtual machine or guest is unable to detect or determine the location of data is on the underlying machine, which means that these memory swap outs and migrations may occur without the guest being involved. Therefore when the guest machine wishes to undertake a NUMA balancing operation, for example migrating data from vNode 0 to vNode 1, i.e., physically moving data from memory node 0 to memory node 1, it assumes that the instructions or data are still in the physical corresponding memory node, for example memory node 0, even if the data has already been swapped out to disk or persistent storage because it wasn't being used in memory.

Therefore for the NUMA operation to continue, the data that was swapped out into disk or persistent storage must first be copied or migrated back into memory node 0, and then the NUMA balancing operation of moving data from memory node 0 into memory node 1 can occur, this step of copying data back into memory node 0 merely to move it to memory node 1 is computationally expensive and places a heavy load on processors, and when scaled, large numbers of similar operations can significantly slow down the NUMA balancing operations and reduce the gains in efficiencies that are supposed to be produced by NUMA balancing.

The present disclosure provides systems and methods to address these problems, and provides for automated and continuous improvements and efficiency gains to both the virtual machine, and the host machine that runs it by improving the efficiency of NUMA balancing operations, especially by removing unnecessary operations while producing the same final outcomes of NUMA balancing in the virtual machine.

In several embodiments of the systems and methods introduced herein (referred to herein as the "present technologies"), pages and data moved from one memory node to another storage mechanism or other memory nodes (referred to herein as "new source location", "persistent storage" and the like) are recorded into a data object or list (referred to herein as "list" or "free list"), this free list is then shared with all its updates and information on the data moved from memory nodes into a new source location, via the hypervisor, with the virtual machine. Every time the virtual machine undertakes a NUMA balancing operation where it attempts to move or migrate data or memory from one vNode to another vNode, it first checks the free list to determine whether the data it intends to move has already been moved, if the data is on the list indicating it has been moved to a new source location, then it sends instructions to the host for the data to either be mapped directly from the new source location to the destination node corresponding to the intended destination vNode, or for the data to be migrated or copied immediately prior to any mapping operations to the memory node corresponding to the destination vNode. This results in data transfers from the new source location without having to first copy data that was moved back into the original source memory node and then migrating it into the destination node for memory balancing to occur.

The presented technologies provide improvement to efficiency by changing the processes in virtual machine NUMA balancing techniques and architectures, and removing a full copy operation from the process leading to substantial gains in processing efficiency, faster processing speeds, and substantial gains realized from NUMA balancing to the underlying computing device. Furthermore, not only are processing costs avoided by removing a copy operation from the process, the present technologies avoid large CPU overheads for transfer copies that will have data crossing the CPU interconnect for the data to be copied from persistent storage or the new source location back into the original source memory node (to only then be copied into the destination node).

Without these disclosed systems and methods, inefficiencies in the virtual machine architecture hinder the performance of virtual machines and reduce the effectiveness of NUMA balancing. Continuous access to a free list that is autonomously updated, in most cases by a hypervisor, that provides it to the guest, allows the guest to provide instructions to the host that are most efficient and based on up to date information, and improves communication and interfacing between the guest and host. Of course this disclosure is not limited to one virtual machine, a free list can be shared amongst multiple guests running on the same or even various different host machines, these may be connected via a network. In some embodiments each guest could have a separate free list produced by a host.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

FIG. 1 presents one embodiment of computing architecture for undertaking efficient copyless NUMA memory migrations. Host machine 100 is presented, this machine could be any form of computing device or technology able to run the methods described herein, including any or all of the structures from computer system 1 and host machine 1000 in FIG. 5. Any or all of the components of host machine 100 can correspond directly with components of host machine 1000 in FIG. 5. Various components of host machine 100 may run host operating system (OS) 105 which controls the operations of host machine 100. Host OS 105 may also include a hypervisor 110 to control the functions and operations of virtual machine 120 and/or to act as a communications interface between physical host machine 100 and virtual machine 120. The virtual machine 120 may include a guest OS 126 which may control the functionality and provide the operational environment language/system upon which VM 120 operates, as well as its virtual processor(s) 128 (vCPU(s)) as well as virtual memory nodes (vNodes), including for example, a virtual guest source memory node(s) 122 and virtual guest destination memory node(s) 124. One or more of Virtual memory nodes 122, 124 and vCPUs 128 are linked or pinned to corresponding nodes in the host machine 100 whereby each memory node for example is linked to a corresponding physical memory node. This pinning of virtual nodes to physical ones allows NUMA balancing to occur and be determined by the virtual machine since migration and balancing of data and pages between virtual nodes are mapped and inherited by their corresponding pinned physical nodes. In various embodiments, the Source vNode 122 is pinned/linked to corresponding source memory node 112, while destination vNode 124 is linked/pinned to corresponding destination memory node 114. This means that processes or data stored on a virtual node is in fact stored on its corresponding physical node 112, or 114.

In several embodiments of the present disclosure, data and/or instructions for one or more programs or processes are located in machine readable, other media, and/or as pages in a source memory node 112; when the programs or processes for these instructions 108 are idle, the host OS 102 may determine that it is more efficient to free up space in memory, i.e., source memory node 112, and swap out the instructions for idle processes by migrating it into a slower persistent storage device or mechanism 104 (e.g., Solid-state Drive or HDD) (i.e., the new source location) whereby the memory node may store data and instructions of more current or running processes. When data or instructions 108 are to be swapped out into a persistent storage device 104, the data or instructions 108 are migrated 111 to the persistent storage 104 which becomes the new source location. However, Source vNode 122 still contains mapping to the data that was moved, because VM 120 does not know that this data has been moved to a new location in the physical host machine 100.

In the methods described herein, the hypervisor 104 exports 113 a shared free list 110 of pages that have been moved from a memory node such as source memory node 112 to new source location such as persistent storage 104. Even if the data has been physically moved on host machine 100, on VM 120, the data is still mapped to the original source vNode node 122 (original source node location). This free list 110 may be in any data format or take the form of any suitable data object. In various embodiments, upon VM 120 undertaking NUMA balancing, on in some embodiments, prior to undertaking NUMA balancing, the VM 120 inspects 115, detects, and/or retrieves a list of pages that have been moved from a source memory node 112 to a new source location as listed in free list 110. In various embodiments VM 120 then sends 117 a request to the host machine, via hypervisor 104.

The request may include instructions to map the data or instructions 108 that are in the new source location or persistent storage 104 to a destination memory node 114 that corresponds to a destination vNode 124 that the VM 120 is trying to move the data into as part of the NUMA balancing operation. In various embodiments, the instructions are to immediately migrate the data to the new destination memory node 114 prior to any mapping operations, to further speed up the process. In various embodiments, both mapping and migration could occur. Therefore upon receiving the instructions the host OS could undertake 119 the instructions by mapping and/or migrating the data instructions 108 to destination memory node 114. Finally the location of the instructions 108 is mapped 121 to a corresponding destination vNode 124. In this manner, the source memory node 112 is no longer involved in the migration or mapping steps and the data or instructions 108 are migrated to a destination node and mapped to a destination vNode 124 without the copying step from persistent storage 104 to source memory node 112. In various embodiments, upon discovery of a page or data that has been moved from a source memory node 112, the mapping to that source memory node is immediately removed in the VM 120.

FIG. 2 presents one embodiment of a method 200 for copyless NUMA memory migrations. First, one or more data objects are exported 210, from a host machine to at least one virtual machine, via a hypervisor, wherein in many aspects of the presented technology, the informative data objects include references to pages that have been migrated from a physical source memory node (source node) on the host machine to a new source location such as persistent storage on the host machine. The informative data objects may include lists of pages, pages, page references, page reference numbers, and the like which are inspected 215 by the virtual machine, to determine or detect 220, by the at least one virtual machine, the pages that have been moved from memory nodes to new source locations. This can occur upon initiation of NUMA balancing or prior to it at the virtual machine level. In several embodiments, one or more of the inspecting or detecting steps may prevent migration of pages from the new source location to the source node corresponding to the virtual source memory node (source vNode) until a request has been sent by the at least one virtual machine, via the hypervisor. Upon determining or detecting the moved pages, the virtual machine sends 225 a request to the host machine via the hypervisor to undertake at least one efficient data migration operation. In various embodiments the request sent comprises a request to migrate data directly from the new source location to the destination node corresponding to the destination vNode prior to mapping operations between the new source location and the destination node. Finally after the request has been sent the host machine undertakes 230 at least one efficient data migration operation. In several embodiments, the at least one data migration operation can be comprised of several various steps, mapping and data migration operations. The at least one data migration operation is explained in further detail in FIG. 3.

FIG. 3 presents one embodiment of a method for undertaking an efficient data migration operation 300. The at least one efficient data migration operation 300 may include one or more operations or steps. In most embodiments, any of these steps may be carried out in any order, and are each optional steps, wherein any or all the described steps may comprise part of the at least one efficient data migration operation 300. Optionally, in embodiments wherein the host machine has received a request to immediately migrate data prior to any mapping operations, the data and instructions in the new source location or persistent storage or other storage mechanism may be migrated 310 immediately to the destination memory node on the host machine prior to any mapping operations being implemented. Alternatively this migration 310 may also occur prior to some mapping operations but after others, depending on the instructions received.

In several embodiments, mapping of pages from the source memory node on the physical host machine is moved to 315 to indicate the moving of data to the destination memory node on the host machine. Mapping 320 may then occur between the new source location, where the data or instructions reside on disk or persistent storage for example, and the destination memory node. Finally data may be migrated 325 from the new source location to the destination node. This could include a read operation from the new source location and a write operation to the new destination node. In several embodiments after the data or instructions have been moved to the destination node on the host machine, this page location is mapped to the corresponding/pinned vNode on the virtual machine completing the data migration process.

FIG. 4 presents an embodiments of the methods described herein executed on various parts of the system(s) discussed. In various embodiments of efficient data migration method 400 a host machine 401 migrates 405 one or more pages from a source memory to a disk or other persistent storage (i.e., a new source location). The host machine 401 then directs 410 the hypervisor 402 to export free list(s) of pages that were migrated to a new source location such as the disk or persistent storage. The hypervisor 402 receives 415 the instructions to export the list to a virtual machine 403, the hypervisor 402 at this stage may in various embodiment also receive a complete or partial list of the moved pages from the host machine 401. The hypervisor then may collect 420 a list of pages that have been swapped out into new source locations such as a disk, known to it through the host machine 401 operating system to either produce or complete any partial lists it may possess. The hypervisor 401 then exports 425 the collected list of moved pages to the virtual machine 403. The list may include references, or page reference numbers of the pages that have been swapped out into disk. The virtual machine then receives 430 the list of pages, or at least access to the list of pages. When the virtual machine 403 attempts NUMA balancing operations, it first accesses 435 the list of pages to receive an update on the location of data or instructions on the physical host machine 401. This is because the virtual machine 403 would not otherwise have access to information on the location of data or instructions in the underlying physical host machine 401. At this point the virtual machine ascertains 440 the location of data on the host machine 401 that it is attempting to migrate or move as part of its NUMA balancing operations based on the references, including in some embodiments page reference numbers, provided in the list. The virtual machine 403 may send a request to do two things, it may send a request 445 to map pages to a new destination node or send 450 a request to immediately migrate the data prior to any mapping operations to the destination node. Whereas mapping can occur after the fact. In most embodiments of the disclosure, in both of these options the request will comprise instructions to remove mapping from the original source memory node i.e., the memory node where the pages or data were swapped out from into the disk or persistent storage, since the data no longer resides in the original source memory node, but now in the new source location persistent storage or disk. The hypervisor 402 transmits 455 this request from the virtual machine 403 to host machine 401 which receives 460 the virtual machine request. The host machine may then remove mapping of pages from source node to destination node 465 since the data is now in a new source location (the persistent storage for example). Depending on the instruction/requests received at 460, the host machine 401 may also map 470 data from the disk to the destination node, the data is then migrated 475 from the disk to the destination node in the host machine 401. The host machine 401 then sends 480 instructions to the hypervisor 402 to map the data onto the corresponding vNode in virtual machine 403 to the physical destination node in host machine 401. The hypervisor then maps 485 the data between the physical and virtual node updating the location of the data, and this updated mapping 490 is received in the virtual machine completing the NUMA balancing process in the virtual machine.

FIG. 5 is a diagrammatic representation of an example computing system 1, with a host machine 1000, within which a set of instructions for causing the machine to perform any one or more of the methodologies discussed herein may be executed. In various example embodiments, the machine operates as a standalone device or may be connected (e.g., networked) to other machines. In a networked deployment, the host machine 1000 may operate in the capacity of a server or a client machine in a server-client network environment, or as a peer machine in a peer-to-peer (or distributed) network environment. The host machine 1000 may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a host machine 1000, which may be a computing device, running a host operating system (OS) 1001 on a processor or multiple processor(s)/processor core(s) 1003 (e.g., a central processing unit (CPU), a graphics processing unit (GPU), or both), and various memory nodes 1005 and 1007. Host OS 1001 may include a hypervisor 1004 which is able to control the functions and/or communicate with a virtual machine ("VM") 1010 running on machine readable media. VM 1010 may also include a virtual CPU or vCPU 1009. Memory nodes 1005, and 1007 may be linked or pinned to virtual memory nodes or vNodes 1006 and 1008 respectively. When a memory node 1005, 1007 is linked or pinned to a corresponding virtual node 1006, 1008, then data may be mapped directly from the memory nodes 1005, 1007 to their corresponding vNodes 1006 and 1008.

All different components shown in host machine 1000 may be connected with each other or communicate to each other via bus (not shown) or via other coupling mechanisms. The host machine 1000 may further include a video display, audio device or other peripherals 1020 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 1002 (also referred to as disk drive unit), and a network interface device 1025. The host machine 1000 may further include a data encryption module (not shown) to encrypt data.

The components provided in the host machine 1000 are those typically found in computer systems that may be suitable for use with embodiments of the present disclosure and are intended to represent a broad category of such computer components that are known in the art. Thus, the computer system 1 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, 10S, CHROME, TIZEN, and other suitable operating systems.

The disk drive unit 1002 may also be a Solid-state Drive (SSD), a hard disk drive (HDD) or other includes a computer or machine-readable medium on which is stored one or more sets of instructions and data structures (e.g., data or instructions 1015) embodying or utilizing any one or more of the methodologies or functions described herein. The instructions 1015 may also reside, completely or at least partially, within the main memory 1015 and/or within the processor(s) 1003 during execution thereof by the host machine 1000. The processor(s) 1003, and memory nodes 1005, 1007 may also constitute machine-readable media.

The instructions 1015 may further be transmitted or received over a network 1030 via the network interface device 1025 utilizing any one of several well-known transfer protocols (e.g., Hyper Text Transfer Protocol (HTTP)). The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the embodiments of the disclosure as described herein.

The computer program instructions may also be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 215 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 1000, with each server 1035 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter.

The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described to best explain the principles of the present technology and its practical application, and to enable others of ordinary skill in the art to understand the invention for various embodiments with various modifications as are suited to the particular use contemplated.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

The various embodiments described above, are presented as examples only, and not as a limitation. The descriptions are not intended to limit the scope of the present technology to the forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A method comprising:
providing one or more data objects, from a host machine to at least one virtual machine via a hypervisor, wherein the data objects include references to pages that have previously undergone a first migration from a physical source memory node (source node) on the host machine to a new source location on the host machine, wherein the first migration of the pages is performed by the host machine independently of the at least one virtual machine, and wherein the new source location is a physical memory node on the host machine; and
subsequent to the first migration:
determining, by the at least one virtual machine, that the pages previously underwent the first migration based on the at least one virtual machine inspecting the references in the data objects;
determining, by the at least one virtual machine, that the pages are to undergo a second migration to a virtual destination memory node (destination vNode);
in response to detecting that the pages previously underwent the first migration to the new source location, and that the pages are to undergo the second migration to the destination vNode, sending a request, by the virtual machine via the hypervisor, to the host machine to undertake at least one data migration operation to implement the second migration, wherein the at least one data migration operation is configured to migrate the pages from the new source location to a physical destination memory node (destination node) corresponding to the destination vNode; and in response to receiving the request, undertaking, by the host machine, the at least one data migration operation to implement the second migration of the pages from the new source location to the destination node.

2. The method of claim 1, wherein the at least one data migration operation comprises one or more of:
mapping the pages to the destination node corresponding to the destination vNode,
removing mapping of the pages from the source node to the destination node, and
mapping, via the hypervisor, the new source location to the destination node, wherein the mapping allows the pages to be migrated from the new source location instead of from the source node.

3. The method of claim 2, further comprising:
migrating the pages from the new source location to the destination node.

4. The method of claim 3, wherein the migrating comprises:
reading the pages from the new source location; and
writing the pages into the destination node.

5. The method of claim 3, further comprising:
mapping the destination node to the destination vNode, wherein the destination node contains the pages.

6. The method of claim 1, wherein the request sent comprises a request to migrate data directly from the new source location to the destination node corresponding to the destination vNode prior to mapping operations between the new source location and the destination node.

7. The method of claim 1, wherein the at least one data migration operation comprises:
migrating data from the new source location to the destination node prior to any implementation of mapping operations between the new source location and the destination node.

8. The method of claim 7, wherein the migrating comprises:
reading the data from the new source location; and
writing the data into the destination node.

9. The method of claim 1 where the inspecting is triggered by an attempted NUMA balancing operation in the virtual machine.

10. The method of claim 1, further comprising:
maintaining, by the hypervisor, updated data objects with additional references to additional pages migrated from source nodes to new source locations.

11. The method of claim 1, wherein the new source location may be comprised of a disk or other storage mechanism.

12. The method of claim 1, further comprising preventing migration of the pages from the new source location to the source node corresponding to a virtual source memory node (source vNode) until a request has been sent by the at least one virtual machine via the hypervisor.

13. The method of claim 1, wherein the references to the pages comprise page reference numbers (PFN).

14. A host computing system, the system comprising:
at least one processor; and
at least one memory storing instructions that, when executed by the at least one processor, are effective to program the at least one processor to:
run an at least one virtual machine on the host computing system, wherein virtual memory nodes (vNodes) of the at least one virtual machine are pinned to corresponding physical memory nodes (nodes) on the host computing system;
run a hypervisor on the host computing system, the hypervisor able to interface between the host computing system and the at least one virtual machine, wherein the hypervisor is configured to control functions of the at least one virtual machine;
provide one or more data objects, from the host computing system to the at least one virtual machine via the hypervisor, wherein the data objects include references to pages that have previously undergone a first migration from a physical source memory node (source node) on the host computing system to a new source location on the host computing system, wherein the first migration of the pages is performed by the host computing system independently of the at least one virtual machine, and wherein the new source location is a physical memory node on the host computing system; and
subsequent to the first migration:
determining, by the at least one virtual machine, that the pages previously underwent the first migration based on the at least one virtual machine inspecting the references in the data objects;
determine, by the at least one virtual machine, that the pages are to undergo a second migration to a virtual destination memory node (destination vNode);
in response to detecting that the pages previously underwent the first migration to the new source location, and that the pages are to undergo the second migration to the destination vNode, send a request, by the virtual machine via the hypervisor, to the host computing system to undertake at least one data migration operation to implement the second migration, wherein the at least one data migration operation is configured to migrate the pages from the new source location to a physical destination memory node (destination node) corresponding to the destination vNode; and
in response to receiving the request, undertake, by the host computing system, the at least one data migration operation to implement the second migration of the pages from the new source location to the destination node.

15. The system of claim 14, wherein the instructions for the at least one data migration operation comprises one or more of:
map the pages to the destination node corresponding to the destination vNode,
remove mapping of the pages from the source node to the destination node, and
map via the hypervisor, the new source location to the destination node, wherein the mapping allows data to be migrated from the new source location instead of from the source node.

16. The system of claim 15, wherein the at least one data migration operation further comprises:
migrating the data from the new source location to the destination node.

17. The system of claim 16, wherein the migrating comprises:
reading the data from the new source location; and
writing the data into the destination node.

18. The system of claim 16, wherein the at least one data migration operation further comprises:

mapping the destination node to the destination vNode, wherein the destination node contains the pages.

19. The system of claim 14, wherein the at least one data migration operation comprises:
migrating data from the new source location to the destination node prior to any implementation of mapping operations between the new source location and the destination node.

20. A non-transitory computer-readable storage medium having embodied thereon a program, the program being executable by a processor to perform a method comprising:
providing one or more data objects, from a host machine to at least one virtual machine via a hypervisor, wherein the data objects include references to pages that have previously undergone a first migration from a physical source memory node (source node) on the host machine to a new source location on the host machine, wherein the first migration of the pages is performed by the host machine independently of the at least one virtual machine, and wherein the new source location is a physical memory node on the host machine; and
subsequent to the first migration:
determining, by the at least one virtual machine, that the pages previously underwent the first migration based on the at least one virtual machine inspecting the references in the data objects;
determining, by the at least one virtual machine, that the pages are to undergo a second migration to a destination virtual destination memory node (vNode);
in response to detecting that the pages previously underwent the first migration to the new source location, and that the pages are to undergo the second migration to the destination vNode, sending a request, by the virtual machine via the hypervisor, to the host machine to undertake at least one data migration operation to implement the second migration, wherein the at least one data migration operation is configured to migrate the pages from the new source location to a physical destination memory node (destination node) corresponding to the destination vNode; and
in response to receiving the request, undertaking, by the host machine, the at least one data migration operation to implement the second migration of the pages from the new source location to the destination node.

* * * * *